United States Patent [19]
DeWolf et al.

[11] 3,966,437
[45] June 29, 1976

[54] HIGH PRESSURE GAS-LIQUID SEPARATOR

[75] Inventors: Charles F. DeWolf, Alameda; William S. Gault, Castro Valley, both of Calif.

[73] Assignee: Rix Industries, Emeryville, Calif.

[22] Filed: July 31, 1973

[21] Appl. No.: 384,245

[52] U.S. Cl. .................................. 55/219; 55/433; 55/466; 55/DIG. 25; 137/195; 137/412
[51] Int. Cl.² ...................................... B01D 29/42
[58] Field of Search ............ 55/219, 218, 210, 428, 55/431, 432, 433, 466, DIG. 25; 137/191, 195, 412, 411, 410, 409, 429

[56] References Cited
UNITED STATES PATENTS

| | | | |
|---|---|---|---|
| 355,815 | 1/1887 | Ghegan ........................ | 137/412 UX |
| 680,717 | 8/1901 | Labadie .............................. | 55/219 |
| 780,682 | 1/1905 | Posch ............................ | 55/DIG. 25 |
| 1,348,016 | 7/1920 | Lee ................................. | 137/412 X |
| 1,463,990 | 8/1923 | Wilson ............................... | 55/219 |
| 2,292,648 | 8/1942 | Moore ............................ | 137/412 X |
| 2,487,933 | 11/1949 | Martin ............................ | 137/412 X |
| 2,689,623 | 9/1954 | Schebler ............................ | 55/219 |
| 2,760,596 | 8/1956 | Kellie ............................... | 55/219 |
| 3,077,713 | 2/1963 | Sinex ................................ | 55/219 |
| 3,093,469 | 6/1963 | Woolston et al. .................... | 55/324 |
| 3,165,470 | 1/1965 | Giesse et al. ....................... | 210/307 |
| 3,204,389 | 9/1965 | Graham ........................ | 137/397 X |
| 3,538,937 | 11/1970 | Diessel et al. ...................... | 73/200 X |
| 3,586,016 | 6/1971 | Meyn ........................ | 220/85 VS X |
| 3,681,028 | 8/1972 | Mason ........................ | 23/230 EP X |
| 3,778,977 | 12/1973 | Conn ................................ | 55/219 |

OTHER PUBLICATIONS
Brink, Jr. et al., "Mist Removal From Compressed Gases," Chemical Engineering Progress, vol. 62, No. 4, Apr. 1966, pp. 60–65.

Bruckshaw, N. B., "Removal of Contamination From Compressed Air," Filtration Separation, vol. 10, No. 3, May/June 1973, pp. 296–302, and 315.

Morehouse et al., "Foamed Thermoplastic Microspheres In Reinforced Polyesters," SPE Journal, vol. 25, May 1969, pp. 45–50.

Resnick, Israel, "Performance of Glass Spheres/Epoxy Syntactic Foam," Modern Plastics, vol. 43, No. 1, Sept. 1965, pp. 144, 146, 149, 151 and 231.

Resnick et al., "Syntactic Foams For Deep Sea Engineering Applications," Naval Engineers Journal, Apr. 1968, pp. 235–243.

*Primary Examiner*—Frank W. Lutter
*Assistant Examiner*—David L. Lacey
*Attorney, Agent, or Firm*—Warren, Chickering & Grunewald

[57] ABSTRACT

A pressure vessel adapted for connection in a high pressure gas line and having a coalescent type filter mounted to extract condensate; a vertical guide fitted with upper and lower magnetically operated switches at positions representing high and low condensate levels; a float carried by the guide for vertical reciprocation and having magnetic means for operating the switches; and an electrically operated valve connected to a condensate drain opening and to a control circuit connected to the switches whereby the condensate will be maintained within upper and lower limits.

2 Claims, 5 Drawing Figures

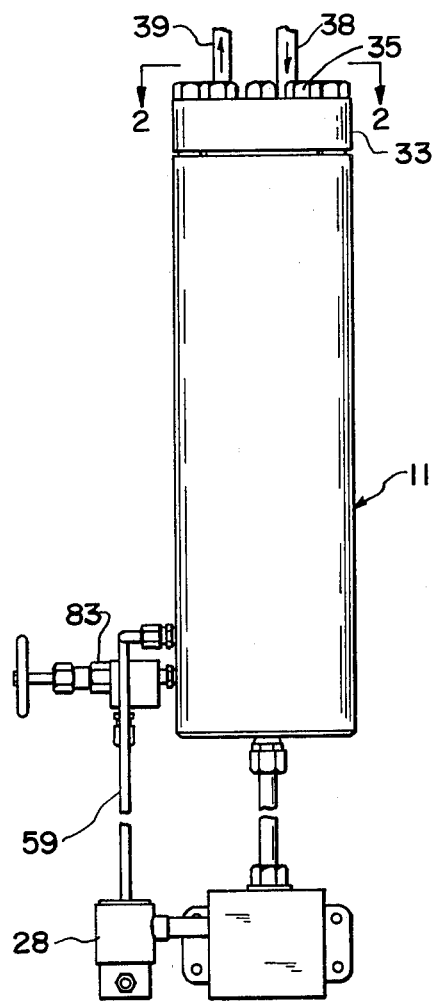
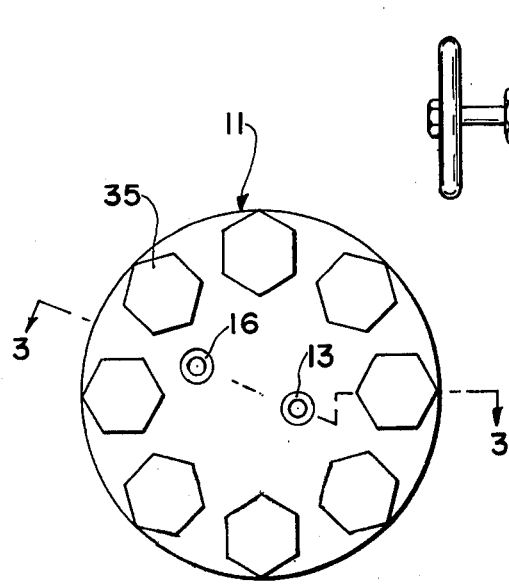
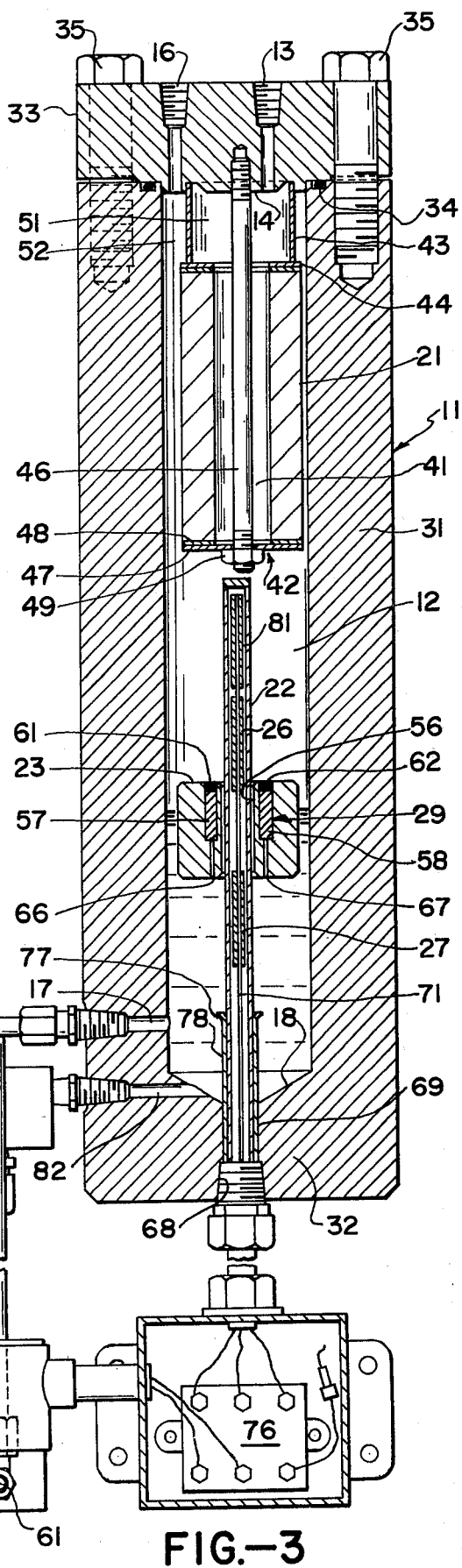
FIG.-1
FIG.-2
FIG.-3

HIGH PRESSURE GAS-LIQUID SEPARATOR

The invention relates to devices such as used with high pressure compressors and the like for removing moisture or other condensate from gases at elevated pressures.

Various gases, including air, which are commonly used in a pressurized state are rarely completely dry. Accordingly, as the gas is compressed, the moisture or condensate level becomes apparent and troublesome. Existing high pressure systems commonly use a periodic blowout system for entrapped condensate. Such systems may use a chamber or reservoir for accumulating condensate and a timer valve connected to evacuate the condensate, the timer being controlled for periodic opening of the valve in accordance with humidity, capacity of the compressor in relationship to the capacity of the separator, etc. Since these factors can only be roughly determined, the dump valve will frequently be opened longer than required to discharge condensate with the result that volumes of gas will be discharged resulting in a loss of both energy and, in certain cases, a serious economic loss of gas.

Float-operated systems have not been feasible in the high pressure applications. Conventionally, such systems function through a mechanical linkage to a dump valve and, accordingly, the float must have substantial buoyancy power to operate the mechanical valve-linkage structure. Relatively large lightweight floats are required. However, these floats are not suitable for high pressure application since they crush easily. Increasing float wall thickness to resist pressure deformation only results in making the float heavier, thus subtracting from its buoyancy and obtainable operating force. Accordingly, this general type of prior art system has had limited application insofar as increasing pressures are concerned and have also had limited reliability.

Another disadvantage in prior art systems has been their inability to accommodate to installations such as aboard ship where the apparatus is subject to roll or tilt.

One of the important features of the present device is its ability to provide a continuous separation of gas and condensate and periodic discharge of the condensate without incurring any loss of compressed gas.

Another object of the present invention is to provide a high pressure gas-liquid separator of the character described which will provide dependable operation in the elevated pressure ranges commonly up to 7500 psi or higher.

A further object of the present invention is to provide a high pressure gas-liquid separator of the character above which will dependably operate under conditions of angular displacement, as for example, aboard ships at sea where rolling and pitching of the ship is a normal operating condition.

Still another object of the present invention is to provide a high pressure gas-liquid separator of the character described which is composed of a minimum number of sturdily formed parts capable of providing dependable, trouble-free performance over a long and useful life.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings:

FIG. 1 is a side elevation of a high pressure gas-liquid separator constructed in accordance with the present invention;

FIG. 2 is a plan view of the unit;

FIG. 3 is a longitudinal cross sectional view on an enlarged scale taken substantially on the plane of line 3—3 of FIG. 2;

Figure 4:
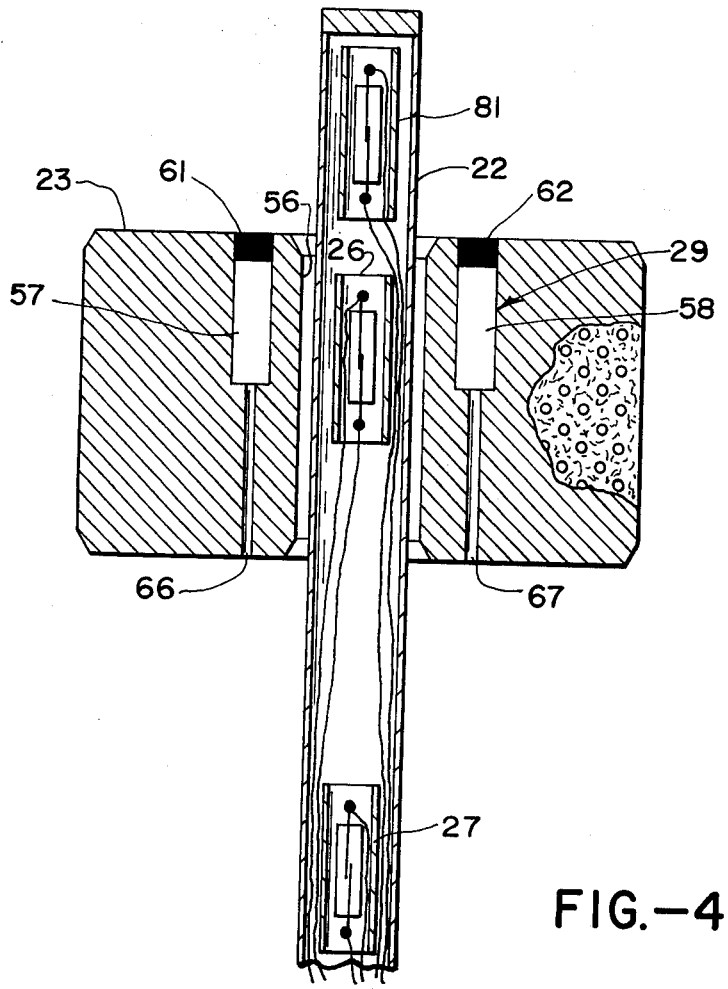
FIG. 4 is a fragmentary longitudinal cross sectional view similar to FIG. 3, but on an enlarged scale of a portion of the mechanism.
Figure 5:
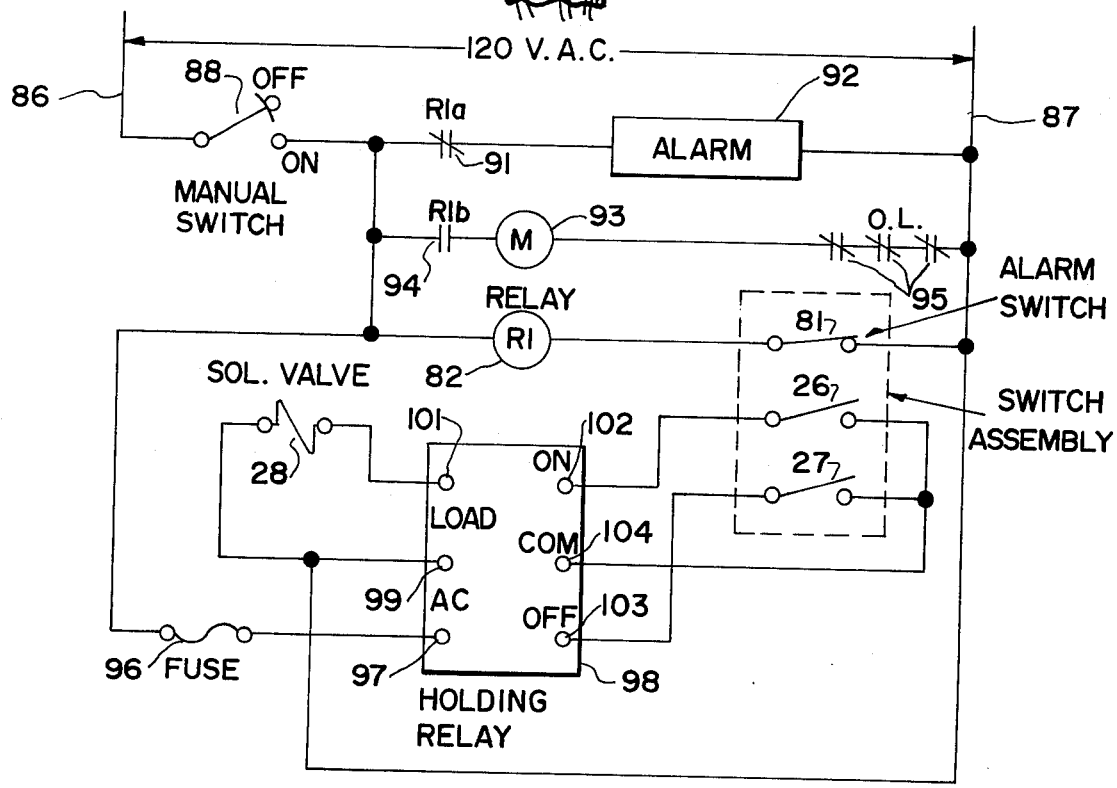
FIG. 5 is a diagrammatic electric wiring diagram used in the present apparatus.

The high pressure gas-liquid separator of the present invention is adapted for connection in high pressure gas lines for removing condensate therein and comprises a pressure vessel 11, having an interior chamber 12, and a high pressure gas inlet 13 opening to chamber 12 at a normally upper end 14 thereof, a gas outlet 16 connected to chamber 12 in spaced relation to inlet 13, and a condensate drain opening 17 leading from chamber 12 adjacent a normally lower end 18 thereof; a coalescent type filter 21 mounted in chamber 12 in sealed registration with inlet 13 for coalescing condensate from gas passing therethrough and depositing condensate in the chamber; an elongate guide member 22 mounted in chamber 12 and having a generally upright position of use therein; a float 23 mounted in chamber 12 on guide member 22 for vertical reciprocation; a pair of magnetically operated switches 26 and 27 carried by guide member 22 in longitudinally spaced positions and representing high and low condensate levels in the chamber; an electrically operated valve 28 connected to drain opening 17; magnetic means 29 carried by float 23 and operating switches 26 and 27 at relatively high and low condensate levels respectively; and an electric control circuit, see FIG. 5, connected to switches 26–27 and valve 28.

Pressure vessel 11 is here formed with a relatively thick sidewall 31, an integral end wall 32 defining the bottom end 18 of chamber 12; and an upper end cap 33 which may be secured and sealed in place by sealing ring 34 and bolts 35. Inlet 13 and outlet 16 are here formed as passages through cap 33 and with exterior sockets for receipt of conventional fittings securing conduits 38 and 39 to the inlet and outlet passages.

Filter 21 is of the so-called coalescing type. It is manufactured from fibrous materials capable of filtering particles to very small sizes in the order of 3 to 5 microns. Such a filter is made by American Machine and Foundry Co., Cuno Division, Meriden, Connecticut. Filter 21 functions to squeeze out moisture from the gas which is expressed through the filter and into the pressure chamber. As here shown, filter 21 is of elongated tubular form having an interior passage 41 and mounting means 42, here secures the filter in place with passage 41 in sealed registration with gas inlet 13. Preferably, filter 21 is spaced somewhat from the upper end 14 of the chamber, provided by end wall or cap 33, so as to drop the position of filter 21 somewhat below outlet 16 so that condensate forming on the outside of filter 21 will not be entrained in the gas discharge. This structure is conveniently provided in the present design by a tube or collar 43 mounted as a coaxial extension of filter 21 and held between the upper end 44 of the filter and interior wall 14 by means of a through bolt 46. A plate 47 is here mounted across the lower end 48 of filter 21 for sealing off the lower end of filter passage 41 and providing a bearing for nut 49 threaded onto the lower end of through bolt 46 and used for clamping the assembly in place. Collar 43 provides an impervious wall defining an interior gas inlet chamber 51, and in cooperation with wall 31 an exterior annular outlet chamber 52. It will be noted that condensate coalescing on the outside wall of filter 21 will gravitate away from chamber 52 so that gas gathering in chamber 52 for exit will be essentially free of condensate.

As an important feature of the present invention, there is employed for the float material a lightweight composition specifically designed for use in high pressure applications. The composition is commonly referred to as syntactic foam and comprises hollow spheres uniformly distributed and bonded together in a resin matrix. Such material is manufactured by Emerson & Cuming, Inc., of Canton, Massachusetts. A preferred form capable of withstanding pressures up to about 15,000 psi, is formulated from glass microballoons dispersed in epoxy resin. The float is here fashioned of toroidal form providing an interior bore wall 56 surrounding and slidably retained on guide member 22. The aforementioned magnetic means 29 here preferably comprises a pair of magnets 57 and 58 carried by the float adjacent bore wall 56 for operating switches 26 and 27 at the high and low condensate levels. As will be understood, the upper switch 26 is connected to open valve 28 thereby initiating flow of condensate from chamber 12 out drain opening 17, conduit 59 connecting opening 17 with valve 28 and thence out of the valve discharge port 61, the flow passage being suitably orificed to prevent explosive dumping of the liquid. The condensate level will then lower in chamber 12 until float 23 gravitates to the level of lower switch 27, which is connected to close valve 28, it being noted that lower switch 27 is positioned well above the bottom wall 18 as well as above drain opening 17 so as to retain a condensate reservoir in the bottom of the chamber above the drain opening.

Switches 26 and 27 are preferably of the magnetically operated reed type, having a normally open position and closed by the presence of the magnets 57 and 58. Magnets 57 and 58 are preferably diametrically opposed so as to provide mechanical balance and are oriented so as to reinforce and intensify the magnetic field across the reed switches when the float is juxtaposed thereto. Simple elongated bar magnets 57 and 58 may be used. These may be mounted in the float by drilling or otherwise providing axially extending recesses 61 and 62 which here open to the upper end of the float for receiving the magnets. The latter may be sealed in the recesses by an epoxy or other sealant. Preferably holes 66 and 67 are provided in the float below and leading to the magnets to provide ventilation. Closing the chamber around the magnets may cause crushing and fracturing of the float by the high pressure. Suitable clearance is provided between the float and guide 22 and between the float and the interior wall of the pressure vessel so as to prevent the blocking of free float movement by lodgment of solid material between the parts. The float will have sufficient density, weighted also by the magnets, to float deeply in the condensate resulting in a minimum bouncing action of the float in response to gas turbulence which may be present in chamber 12.

The bottom wall 32 of the pressure vessel is here formed with an axially extending opening 68 for receipt and securing of the lower end 69 of guide member 22 for supporting the latter axially within chamber 12. Preferably, and as here shown, guide member 22 is of non-magnetic material having an interior passage 71 registering with opening 68 for communicating passage 71 exteriorly of the vessel. Switches 26 and 27 may be conveniently mounted in passage 71 in sealed relation to chamber 12 and for magnetic operation through the side wall of guide member 22, and conductors 22 connected to switches 26 and 27 may be conveniently brought out through passage 71 for a connection to a relay 76 forming part of the electric control circuit.

Means is provided for supporting float 23 in a lowermost position corresponding with its magnetic operation of lower switch 27, that is, to prevent the float from descending to a position below switch 27, which would cause its opening in the same manner as an upward movement of the float away from switch 27. As here shown, such means here comprises the upper end 77 of a sleeve 78 mounted around the lower end 69 of guide member 22, end 77 being flanged out to engage and support the underside of float 23, thereby defining the lowermost float position.

Preferably, and as here shown, a third magnetically operated safety and alarm switch 81 is mounted in the interior passage 71 of guide member 22 above the upper level limit switch 26. Switch 81 may be connected to energize a light or audible alarm as may be desired to indicate that condensate had collected in chamber 12 above the predetermined normal upper level, and also to shut down the compressor. The operator may then inspect for an impediment in the discharge flow or defective operation of switch 26 and/or the connected control circuit.

As will be understood in the operation of the present device, a constant condensate reservoir is normally maintained in the bottom of chamber 12 so that at no time during normal condensate discharge will there be a loss of gas from the connected high pressure system. Over protracted periods of use, however, a certain amount of sludge and solid material will be deposited and build up in the bottom reservoir, and it is desirable from time to time to flush out the accumulated material in the sump. For this purpose there is provided a second drain passage in vessel 11 leading from the bottom wall 18 of the chamber and which is connected to a manually operated valve 83. While for simplicity of illustration passages 17 and 82 are shown in the same plane in FIG. 3, it will be understood that these passages may be offset to facilitate making of connections shown. It will also be noted that passage 17 is positioned above the bottom wall 18 of the chamber so as to provide a sump below opening 17 for deposit of sludge and solid matter away from the opening, thereby decanting the condensate taken off passage 17.

An electrical schematic diagram is shown in FIG. 5. Switches 27 and 28 are shown in their normal open position and safety switch 81 in its normally closed position. As will be understood, the normally open or closed position of these switches is a circuit option. Electric power is supplied by conductors 86 and 87 which are connected through a manual control switch 88 to the coil of relay 82 which is connected in series with safety switch 81 across the power supply lines.

Energizing of coil 82 opens normally closed relay contacts 91 which are connected in series with an alarm 92 across the power leads. Accordingly, upon raising of the condensate level to the upper alarm point, magnets 57 and 58 in the float will cause switch 81 to open thereby deenergizing coil 82 and permitting contacts 91 to return to their closed position thereby energizing alarm 92. As above noted, the latter may comprise a light, audible alarm, or the like. Also controlled by safety switch 81 and relay coil 82 is the starter relay 93 for the compressor motor which is here mounted in series with a second set of normally open relay contacts 94 across the power leads 86 and 87. Contacts 94 will be closed on energizing of relay coil 82 so as to in turn energize the starter 93 for the compressor motor. Also here shown in series with starter 93 are three normally closed overload switches 95 which are controlled by the current in three legs of a three phase compressor motor.

Power lead 86 is connected through a fuse 96 to one power supply terminal 97 of a solid-state holding relay 98. Here depicted is a standard solid-state relay as manufactured by Gems Division of DeLaval Turbine, Farmington, Connecticut, under the trademark Flip-Pak. Of course, any type of lock-in relay circuit may be used. The other power lead 87 is here connected to a second power supply terminal 99 of the holding relay. Solenoid valve 28 is connected across terminal 99 and relay load terminal 101. Also provided on holding relay 98 are on, off, and common terminals 102, 103, and 104 which are connected to switches 26 and 27, as illustrated. upon raising of the float to the upper condensate level, switch 26 will close and the holding relay described functions on momentary closure of the on to common terminals to energize the load terminals 99–101 and to hold these terminals energized after switch 26 has reopened. Momentary closing of the off sensor 27 will function to deenergize the load and even to override the on circuit if it is still actuated. This override provides an integral "fail-safe" feature of the particular holding relay described.

We claim:

1. A high pressure gas-liquid separator adapted for connection in high pressure gas lines for removing condensate therein comprising:

a pressure vessel having a wall means formed for containment of a gas pressure up to about 15,000 psi, therein, said pressure vessel defining a first chamber, and said first chamber having a gas outlet connected thereto;

a coalescent-type filter comprising a hollow porous filter body having an interior, second, chamber and mounted in a normally upper portion of said first chamber to define below said filter in a lower portion of said first chamber a condensate sump;

a condensate drain opening in said vessel communicating with said condensate sump;

said filter body having an exterior wall spaced from the interior wall of said first chamber to define an annular passage surrounding said filter body for gravitation into said condensate sump of condensate on said exterior wall;

a gas inlet passage communicating with said second chamber for gas flow into said second chamber and for gas flow through said porous filter body to said exterior wall, said filter body being adapted to coalesce condensate from gas passing through said filter body and release coalesced condensate on said exterior wall;

an elongate guide tube mounted in said first chamber below said filter in a generally upright position of use and being sealed in a normally lower end of said vessel, said guide tube being adapted to withstand high gas pressures in said first chamber;

a float composed of snytactic material mounted in said first chamber and on said guide tube for vertical reciprocation;

a pair of magnetically operated switches mounted interiorly of said guide tube in longitudinally spaced positions representing high and low condensate levels;

an electrically operated valve connected to said drain opening;

magnetic means carried by said float and operating said switches at relatively high and low condensate levels respectively; and an electric control circuit connected to said switches and electrically operated valve.

2. A gas-liquid separator as defined in claim 1, said float having a through bore surrounding and slideably retained on said guide member;

said magnetic means comprising a pair of magnets carried by said float adjacent said bore and operating said switches at relatively high and low condensate levels; and the upper of said switches being connected to open said valve and the lower of said switches being connected to close said valve, said lower switch being positioned to retain a condensate reservoir in the bottom of said first chamber above said drain opening.

* * * * *